(12) United States Patent
Langguth et al.

(10) Patent No.: US 8,270,341 B2
(45) Date of Patent: Sep. 18, 2012

(54) METHOD FOR MULTI-HOP DATA TRANSMISSION IN AN AD-HOC NETWORK COMPRISING CONCEALED NODES

(75) Inventors: Torsten Langguth, Unterhaching (DE); Henrik Schober, Woerth (DE); Thomas Nicolay, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 23 days.

(21) Appl. No.: 12/282,506

(22) PCT Filed: Feb. 27, 2007

(86) PCT No.: PCT/EP2007/001682
§ 371 (c)(1),
(2), (4) Date: Dec. 4, 2008

(87) PCT Pub. No.: WO2007/104424
PCT Pub. Date: Sep. 20, 2007

(65) Prior Publication Data
US 2009/0175170 A1    Jul. 9, 2009

(30) Foreign Application Priority Data

Mar. 10, 2006 (DE) .......................... 10 2006 011 259
Mar. 28, 2006 (DE) .......................... 10 2006 014 308

(51) Int. Cl.
*H04B 7/212* (2006.01)
(52) U.S. Cl. ...................................... 370/322; 370/447
(58) Field of Classification Search .................. 370/322, 370/445, 447
See application file for complete search history.

(56) References Cited

U.S. PATENT DOCUMENTS

| | | | |
|---|---|---|---|
| 5,636,223 A | 6/1997 | Reardon | |
| 5,661,727 A | 8/1997 | Kermani | |
| 5,805,569 A * | 9/1998 | Lindqvist et al. | 370/229 |
| 2002/0172186 A1 | 11/2002 | Larsson | |
| 2004/0240426 A1 | 12/2004 | Wu | |
| 2005/0041616 A1 * | 2/2005 | Ginzburg et al. | 370/328 |
| 2005/0089057 A1 | 4/2005 | Kang | |
| 2006/0029007 A1 | 2/2006 | Ayyagari | |
| 2006/0045117 A1 | 3/2006 | Qi | |

(Continued)

FOREIGN PATENT DOCUMENTS
EP       1509006 A1     2/2005
(Continued)

OTHER PUBLICATIONS

English Translation of International Preliminary Report on Patentability mailed Oct. 23, 2008, issued in corresponding Application No. PCT/EP2007/001682, filed Feb. 27, 2007, 9 pages.

(Continued)

*Primary Examiner* — Anh-Vu H Ly
*Assistant Examiner* — Matthew Hopkins
(74) *Attorney, Agent, or Firm* — Christensen O'Connor Johnson Kindness PPLC

(57) ABSTRACT

A method for multi-hop data transmission in an ad-hoc network comprising concealed nodes. A source node determines the probability of a collision-free transmission of data to the following nodes and if a high probability of collision-free transmission is present, transmits a data packet to a following node without coordinating transmission-channel allocation with concealed nodes disposed in the vicinity of the next node.

8 Claims, 3 Drawing Sheets

U.S. PATENT DOCUMENTS

2007/0105575 A1* 5/2007 Sampath et al. .............. 455/509
2008/0298250 A1* 12/2008 Larsson ....................... 370/238

FOREIGN PATENT DOCUMENTS

| GB | 2412273 A | 9/2005 |
| WO | 03079708 A1 | 9/2003 |
| WO | 03088578 A1 | 10/2003 |
| WO | 03088587 A1 | 10/2003 |

OTHER PUBLICATIONS

International Search Report mailed Mar. 10, 2008, issued in corresponding Application No. PCT/EP20071001682, filed Feb. 27, 2007, 3 pages.

* cited by examiner

METHOD FOR MULTI-HOP DATA TRANSMISSION IN AN AD-HOC NETWORK COMPRISING CONCEALED NODES

BACKGROUND

The invention relates to a method for multi-hop data transmission in an ad-hoc network with concealed nodes.

A mobile ad-hoc network (MANET) consists of a quantity of radio devices, which form a temporary network in a dynamic manner, in which every radio device acts as a router for the respective other radio devices and accordingly, no central infrastructure is required.

One important point with MANETs is the co-ordination of access to the jointly-used transmission resource. In each case only one device may transmit, because otherwise collisions can occur, which lead to the loss of information transmitted.

A medium-access-control (MAC) protocol coordinates access and defines how the radio devices can divide the limited transmission resource in an efficient and fair manner. Particularly in the ad-hoc domain, MAC methods, which co-ordinate channel access on the basis of information regarding the channel loading, are extremely-widespread. Methods of this kind are referred to in general by the term carrier-sensing-multiple-access (CSMA). One widely used WLAN method IEEE 802.11 is based on CSMA.

In the case of CSMA methods, all stations wishing to transmit monitor the medium. If the medium is already occupied, the stations wishing to transmit must wait. If the medium is not occupied, the stations wishing to transmit may occupy the medium and transmit. In order to avoid collisions at the end of a transmission, the channel access can be controlled by a random waiting time. Different stations have different waiting times at the end of a transmission, so that one station occupies the medium first. The other stations recognise this through channel monitoring and suspend their transmission request until the end of the current transmission. The medium is regarded as occupied, if the received signal strength is disposed above a given threshold value.

MANETs have a dynamic, random topology, which sometimes changes rapidly. The radio devices communicate directly with their neighbouring radio devices (adjacent nodes) if these are within the range, or otherwise via several radio devices acting as intermediate nodes (multi-hop), which route the information to the target radio device (target node). Such networks are very robust because of the decentralised structure; however, they require independent control and co-ordination by the individual network nodes.

For a multi-hop operation, every radio node provides a routing table with the topology of all participating radio nodes. In the case of proactive routing within a given time raster, these routing tables are updated by means of data exchange with the adjacent radio nodes; in the case of reactive routing, the routing tables are updated only at the times of the user-data exchange with the adjacent radio nodes. If the source node finds the target node in the routing table, the data packet to be transmitted is transmitted from the radio node wishing to transmit via the routing pathway for all known intermediate nodes to the target node.

As shown in FIG. 1, a network blockage can occur, if two nodes, within the range of which the respective, other node is not contained, share an identical node, which is disposed within their range. If the two nodes wish to communicate with their identical node at the same time, their respective signals will collide, and this cannot be prevented by the CSMA method because of the lack of co-ordination between the two nodes. The performance capability of the mobile ad-hoc network is reduced by a network blockage of this kind. Since the two transmitting nodes are each disposed outside the range of the other node, they each represent concealed nodes for the respective, other node.

The identification of concealed nodes of this kind therefore represents an important measure for increasing the performance capacity of the mobile ad-hoc network.

The RTS-CTS method according to FIG. 2 is often used in order to avoid collisions between the concealed nodes. In this context, a transmitter first transmits a short message (RTS) for notification of the transmission. The receiver also responds with a short message (CTS). This is followed by the actual user-data transmission. As a result of the RTS and CTS messages, all stations within the range of the transmitter and receiver are notified about the transmission. During the transmission, the other stations themselves must not transmit in order to avoid collisions.

The transmission of RTS and CTS messages uses transmission capacity, which is therefore not available for the transmission of the user-data packets. Especially with a transmission of small user-data packets, the transmission of RTS and CTS messages has a significant, negative impact. Accordingly, the RTS-CTS method is used only above a given size of user-data packet.

WO/03/079708 A1 discloses a method for identifying a concealed node. In this context, a control message is transmitted from a node wishing to transmit to an adjacent node, in the vicinity of which a node concealed from the node wishing to transmit is disposed, and is finally routed from the adjacent node to the concealed node, which sends an acknowledgement message back to the node wishing to transmit via the adjacent node. This acknowledgement message is used by the node wishing to transmit as an indicator for the existence of a concealed node disposed in the vicinity of the adjacent node.

SUMMARY

The object of the invention is to provide a method for multi-hop data transmission in an ad-hoc network with concealed nodes, which avoids collisions with user-data packets of concealed nodes and, at the same time, improves the efficiency of the transmission channel.

This object is achieved by the subject matter of the method according to the invention for multi-hop data transmission in an ad-hoc network with concealed nodes with the features of claim 1. Advantageous further developments are specified in the dependent claims.

According to the invention, in the event of a data-transmission wish by a node in the ad-hoc network, the probability of a collision-free data transmission is determined by the said node, and, in the case of a high probability of a collision-free transmission, the data transmission is implemented without the implementation of a co-ordination process regarding the transmission-channel allocation within the concealed nodes disposed in the vicinity of the next node.

Only in the case of a low probability of a collision-free transmission is a co-ordination process implemented, for example, via an RTS-CTS method, with regard to the transmission-channel allocation with the concealed nodes disposed within the vicinity of the next node.

In this manner, the transmission channel is loaded with a minimised number of co-ordination processes between the nodes wishing to transmit and the concealed nodes disposed within the vicinity of the next node by comparison with prior-art methods, thereby achieving an improved efficiency of the transmission channel.

In order to determine the probability of a collision-free transmission, the node wishing to transmit determines the number of concealed nodes, which are disposed in the vicinity of the nearest node positions within the routing pathway of its data transmission. For this purpose, according to WO 03/088587 A1, the node wishing to transmit can evaluate in advance the routing information exchanged for the routing with its adjacent nodes without wasting additional transmission capacity for the identification of concealed nodes.

The larger the number of identified, concealed nodes in the vicinity of the next node in the routing pathway, the higher will be the probability of collisions occurring. Additionally, the average transmission volume between the next node and every concealed node disposed in its vicinity can be registered by the node wishing to transmit in order to determine the probability of a collision-free transmission. For this purpose, the packet size, the data type and/or the service class of every user-data packet transmitted between the next node and the concealed nodes disposed in its vicinity is registered and evaluated statistically.

Especially in the case of periodic data-transmission behaviour, an evaluation of the average transmission volume between the next node and every concealed node disposed in its vicinity over time allows an identification of times with a high probability for a collision-free data transmission.

DESCRIPTION OF THE DRAWINGS

The method according to the invention for multi-hop data transmission in an ad-hoc network with concealed nodes is explained in detail below with reference to the drawings. The drawings are as follows:

With reference to FIG. 3, the following section explains in detail the method according to the invention for multi-hop data transmission in an ad-hoc network with concealed nodes.

Figure 1:
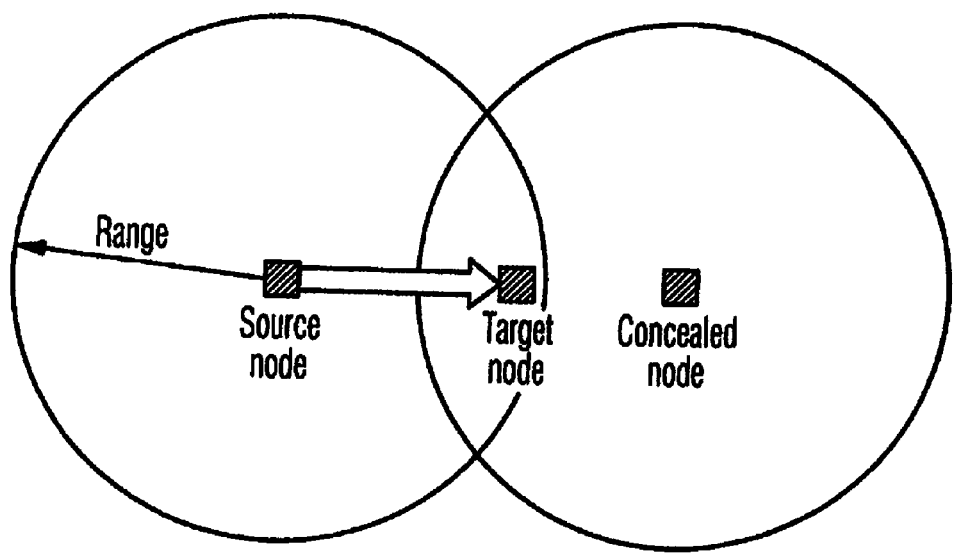
FIG. 1 shows a diagram of the spatial distribution of transmitting, adjacent and concealed nodes.
Figure 2:
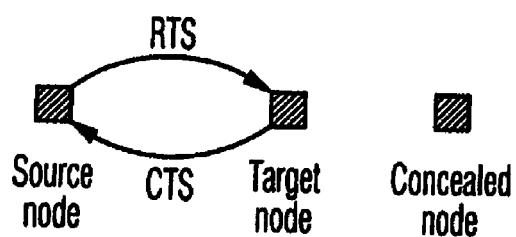
FIG. 2 shows a diagram of the data exchange within an RTS-CTS method.
Figure 3:
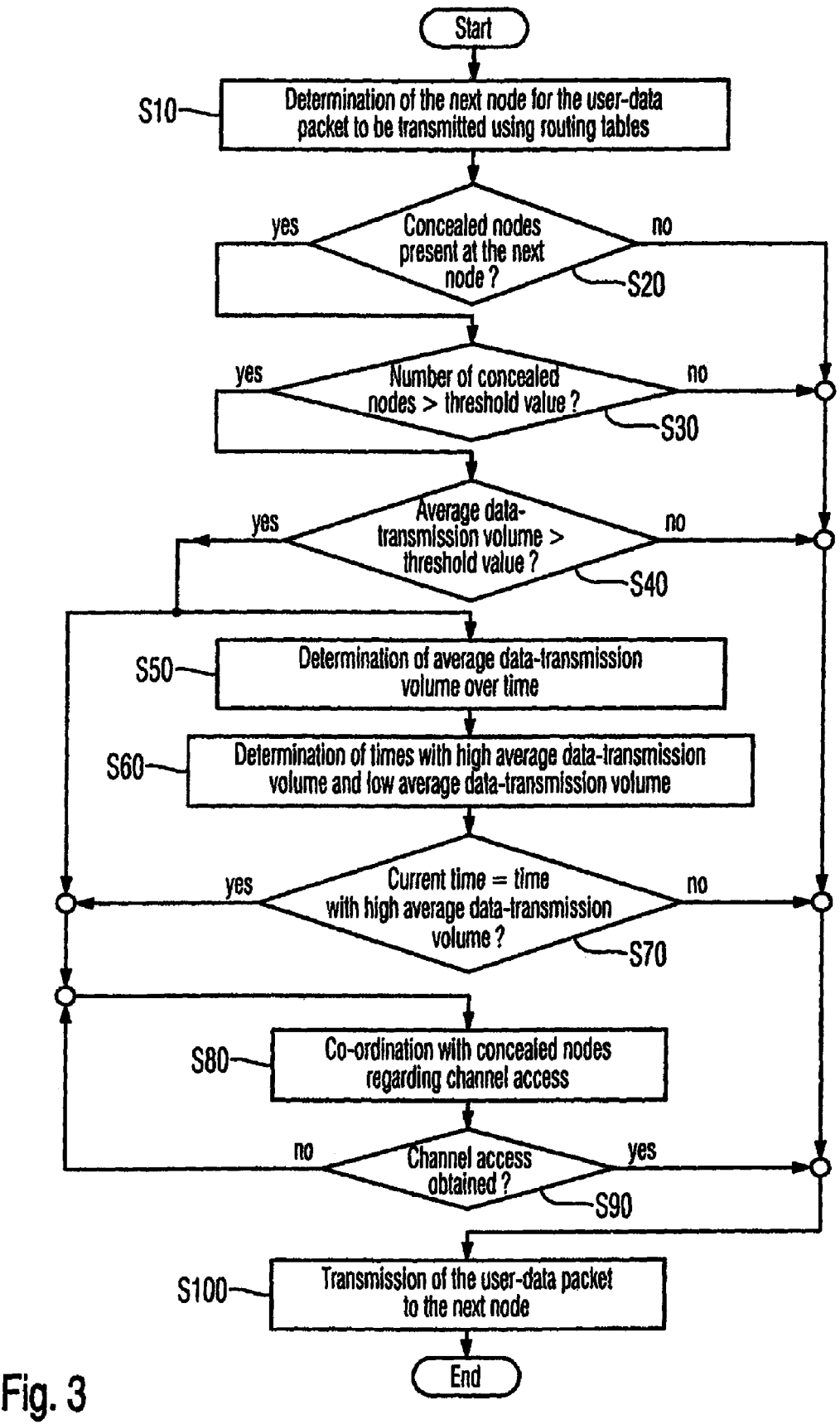
FIG. 3 shows a flow chart of the method according to the invention for multi-hop data transmission in an ad-hoc network with concealed nodes.

In the first procedural stage S10, a node in the ad-hoc network, which wishes to transmit a user-data packet to a target node, determines the next node in the ad-hoc network from available routing tables within the framework of a routing method. Routing methods according to the prior art are used for this purpose.

DETAILED DESCRIPTION

In the following description, the term "source node" is used to refer to the node, at which the data packet is currently present, while the term "target node" refers to the node, to which the source node transmits the data packet.

In the next procedural stage S20, the node which wishes to transmit determines concealed nodes disposed in the vicinity of the next node using a method for the identification of concealed nodes in an ad-hoc network according to the prior art, for example, according to the method described in WO/03/088578 A1. If this method fails to identify any concealed nodes in the vicinity of the next node, a collision is not to be anticipated when the user-data packet to be transmitted by the node which wishes to transmit is transmitted, and, according to procedural stage S100, the node which wishes to transmit can then transmit the user-data packet to the next node without the occurrence of problems.

However, if this method identifies at least one concealed node in the vicinity of the next node, it will be determined in the next procedural stage S30, whether the number of concealed nodes identified exceeds a specified threshold value. If the identified number of concealed nodes is disposed below the threshold value, a high probability for a collision-free data transmission can be assumed when the user-data packet to be transmitted is transmitted by the node wishing to transmit, and the node wishing to transmit transmits the user-data packet to the next node according to procedural stage S100 with a comparatively-low risk of occurrence of problems.

However, if the number of concealed nodes identified is disposed above the threshold value, the average data-transmission volume between the next node and the concealed nodes disposed in its vicinity can be determined over a relatively-long period by registration and statistical evaluation of the user-data packets transmitted between the next node and every concealed node disposed in the vicinity of the next node. For example, the packet size, the data type and/or the service class of the user-data packets transmitted respectively between the next node and the concealed nodes disposed in the vicinity of the next node can be used as parameters for the determination of the average data-transmission volume.

If this average data-transmission volume is disposed below a specified threshold value, a high probability of a collision-free data transmission can be assumed in spite of the existence of a minimum number of concealed nodes disposed in the vicinity of the next node. In this case, the node wishing to transmit can transmit the user-data packet to be transmitted to the next node according to procedural stage S100 with a comparatively low risk of problems occurring.

If the number of concealed nodes identified according to procedural stage S30 is above a specified threshold value, and/or if the average data-transmission volume exceeds a threshold value in procedural stage S40, the time characteristic of the average data-transmission volume between the next node and every concealed node disposed within the vicinity of the next node can optionally be registered in procedural stage S50. With periodically-occurring data-transmission traffic between the next node and the concealed nodes disposed within the vicinity of the next node, times with a relatively-lower average data-transmission volume and accordingly with a higher probability for a collision-free data transmission, and times with a relatively-higher average data-transmission volume and therefore with a lower probability for a collision-free data transmission may be present.

In a subsequent, also optionally-implemented procedural stage S60, those time slots, in which a high average data-transmission volume is present, and those time slots, in which a low average data-transmission volume is present, can be determined from this optionally-determined time characteristic of the average data-transmission volume.

Finally, in a subsequent and also optionally-implemented procedural stage S70, it is determined whether a time slot with high average data-transmission volume is present at the current time. If there is currently no time slot with a high average data-transmission volume, then the current probability for a collision-free data transmission is comparatively high, and the node wishing to transmit will transmit the user-data packet to the next node in procedural stage S100.

By contrast, if a time slot with a high average data-transmission rate is currently present, the current probability for a collision-free data transmission is low, and—as in the case of a number of identified, concealed nodes disposed above the specified threshold value according to procedural stage S30, and/or in the case of an average data-transmission volume disposed above a specified threshold value according to procedural stage S40—in the next procedural stage S80, the node wishing to transmit will co-ordinate with a concealed node disposed within the vicinity of the next node regarding the next channel access without implementing the optional procedural stages S50 to S70. In this context, the above-mentioned RTS-CTS method may be used with the intermediate connection of the next node, but other methods for transmission-channel allocation within a CSMA system can, in fact, also be used.

When the transmission channel is finally allocated to the node wishing to transmit, the user-data packet to be transmitted to the next node is transmitted by the node wishing to transmit in procedural stage S100.

Figure 4:
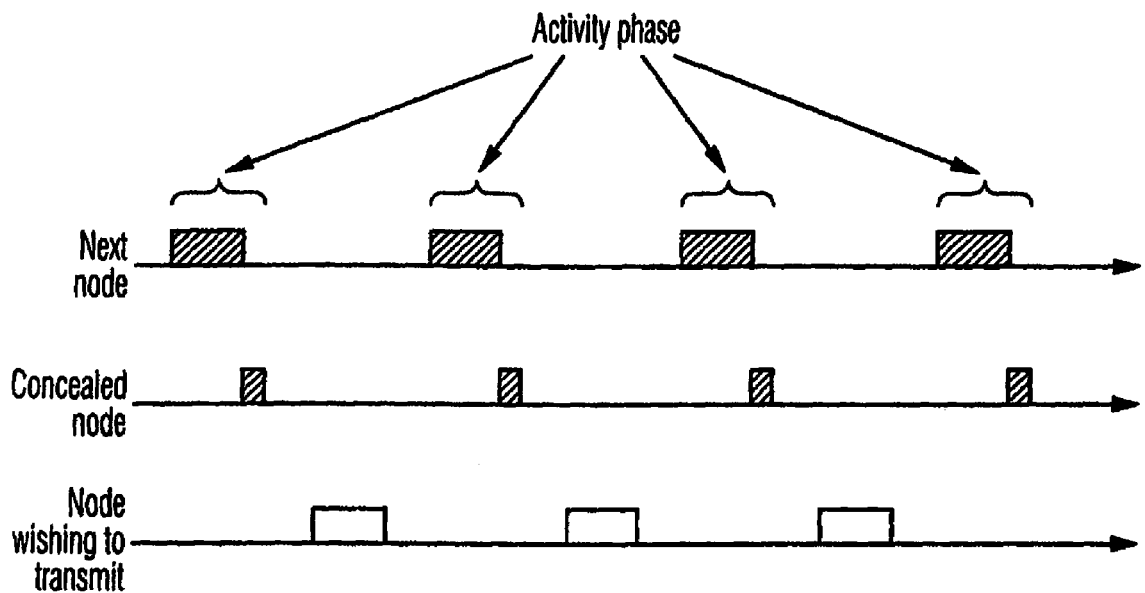
FIG. 4 shows a time-flow diagram of a typical loading of the transmission channel in an ad-hoc network.

The time-flow diagram in FIG. 4 shows the loading of the transmission channel in an ad-hoc network with periodically-occurring data-transmission volumes between the next node and a concealed node disposed in its vicinity. The periodically-occurring time slots with high average data-transmission volume (with shading) and the resulting time slots with low average data-transmission volume, in which the node wishing to transmit can transmit the user-data packets to be transmitted to the next nodes (without shading), are clearly evident.

Figure 5:
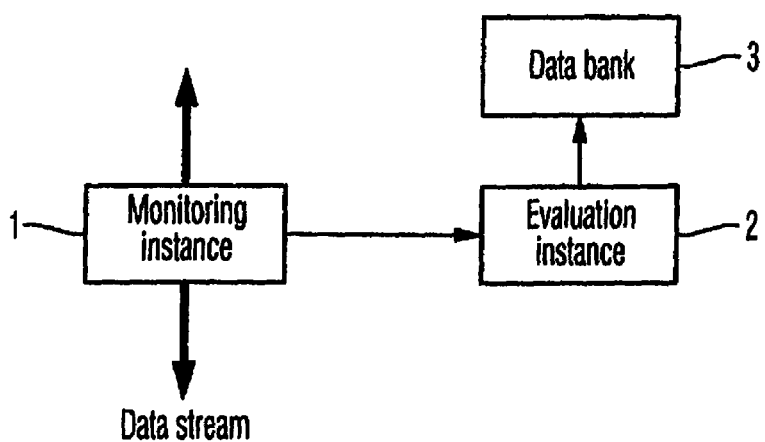
FIG. 5 shows a block-circuit diagram of the system according to the invention for multi-hop data transmission in an ad-hoc network with concealed nodes.

FIG. 5 shows a block-circuit diagram of the system according to the invention for multi-hop data transmission in an ad-hoc network with concealed nodes, which is implemented in every node of the ad-hoc network.

The system according to the invention consists of a monitoring instance 1, which analyses and extracts all received user-data packets with regard to the information relevant for the method according to the invention—MAC target address, MAC source address, packet size, data type, service class, time of transmission etc. The monitoring instance 1, which is preferably realised in the network layer, can implement the extraction of the relevant data of the received user-data packet either separately for an individual layer, preferably the network layer, and the relevant data in this layer to be extracted from the user-data packet, or alternatively, in an interconnected manner for all layers of the node and the relevant data to be extracted from the user-data packet in all layers of the node.

The information extracted from the received user-data packet is analysed and evaluated by an evaluation instance 2 connected downstream of the monitoring instance 1, which is also preferably implemented in the network layer (threshold-value comparison of the number of identified, concealed nodes, determination of the average data-transmission value consisting of packet size, data type and/or service class, threshold-value comparison of the average data-transmission volume, identification of the periodicity of the characteristic of the average data-transmission volume). The evaluated information is stored adjacent to the routing tables and the concealed nodes identified in each case in the vicinity of the individual next nodes, in a databank 3.

The invention is not restricted to the exemplary embodiment presented. All of the measures described above can be combined with one another as required within the framework of the invention.

The invention claimed is:

1. A method for multi-hop data transmission in an ad-hoc network with concealed nodes, comprising:
   determining, at a first node prior to transmitting, a probability of a collision-free data transmission to a next node; and
   in the case of a high probability of a collision-free data transmission, transmitting, from the first node, a user-data packet to the next node without coordinating, via the next node, with concealed nodes disposed in a vicinity of the next node regarding the data transmission to the next node;
   wherein a time characteristic of an average data-transmission volume between the next node and every concealed node is registered, and wherein the first node transmits the user-data packet to the next node, without coordinating with the concealed nodes, in periodically-occurring time slots with a relatively-lower average data transmission volume.

2. The method for multi-hop data transmission according to claim 1, wherein the probability of a collision-free data transmission to the next node is evaluated as high if a small number of concealed nodes are identified in the vicinity of the next node.

3. The method for multi-hop data transmission according to claim 1, wherein the probability of a collision-free data transmission to the next node is evaluated as low if a high average data-transmission volume is identified between the next node and every concealed node within the vicinity of the next node.

4. The method for multi-hop data transmission according to claim 1, wherein times with a low probability for a collision-free data transmission to the next node are determined as times with a high average data-transmission volume between the next node and every concealed node identified within the vicinity of the next node.

5. The method for multi-hop data transmission according to claim 1, wherein a packet size, a data type, and/or a service class of every user-data packet transmitted between the next node and every concealed node identified within the vicinity of the next node are registered and statistically evaluated in order to determine the average data-transmission volume between the next node and every individual concealed node identified in the vicinity of the next node.

6. The method for multi-hop data transmission according to claim 1, wherein, in the case of a high average data-transmission volume, at times with high average data-transmission volume and/or with a large number of concealed nodes identified within the vicinity of the next node, the first node coordinates via the next node with the concealed nodes disposed in the vicinity of the next node regarding the data transmission to the next node.

7. The method for multi-hop data transmission according to claim 6, wherein the coordination between the first node and the concealed nodes disposed within the vicinity of the next node is implemented via a Request To Send/Clear To Send (RTS/CTS) method.

8. The method for multi-hop data transmission according to claim 7, where the first node coordinates with the concealed nodes disposed in the vicinity of the next node regarding transmission channel allocation.

* * * * *